United States Patent
Kumar

(10) Patent No.: US 9,924,564 B2
(45) Date of Patent: Mar. 20, 2018

(54) HEATED MAT AND EXHAUST GAS TREATMENT DEVICE

(75) Inventor: Amit Kumar, Getzville, NY (US)

(73) Assignee: Unifrax I LLC, Tonawanda, NY (US)

( * ) Notice: Subject to any disclaimer, the term of this patent is extended or adjusted under 35 U.S.C. 154(b) by 919 days.

(21) Appl. No.: 13/294,256

(22) Filed: Nov. 11, 2011

(65) Prior Publication Data

US 2012/0121478 A1 May 17, 2012

Related U.S. Application Data

(60) Provisional application No. 61/412,437, filed on Nov. 11, 2010.

(51) Int. Cl.
- *F01N 13/14* (2010.01)
- *H05B 3/12* (2006.01)
- *F01N 3/021* (2006.01)
- *F01N 3/022* (2006.01)
- *F01N 3/20* (2006.01)
- *F01N 3/28* (2006.01)
- *B32B 5/26* (2006.01)
- *F01N 3/08* (2006.01)

(52) U.S. Cl.
CPC ........... *H05B 3/12* (2013.01); *B32B 5/26* (2013.01); *F01N 3/0211* (2013.01); *F01N 3/0222* (2013.01); *F01N 3/2013* (2013.01); *F01N 3/2857* (2013.01); *B32B 2262/10* (2013.01); *F01N 3/0814* (2013.01); *F01N 3/2066* (2013.01); *Y02T 10/26* (2013.01)

(58) Field of Classification Search
CPC .... F01N 3/2013; F01N 3/2853; F01N 3/2857; H05B 3/36; B01D 53/88
See application file for complete search history.

(56) References Cited

U.S. PATENT DOCUMENTS

| | | |
|---|---|---|
| 3,012,923 A | 12/1961 | Slayter |
| 3,458,329 A | 7/1969 | Owens et al. |
| 3,500,444 A * | 3/1970 | Brower et al. ............... 219/544 |
| 3,510,394 A | 5/1970 | Cadotte |
| 3,649,406 A | 3/1972 | McNish |
| 3,674,621 A | 7/1972 | Miyamoto et al. |
| 3,771,967 A | 11/1973 | Nowak |
| 3,798,006 A | 3/1974 | Balluff |
| 3,957,573 A | 5/1976 | Miyamoto et al. |
| 3,996,145 A | 12/1976 | Hepburn |
| 4,011,651 A | 3/1977 | Bradbury et al. |
| 4,093,423 A | 6/1978 | Neumann |
| 4,101,280 A | 7/1978 | Frietzsche et al. |
| 4,142,864 A | 3/1979 | Rosynsky et al. |
| 4,159,205 A | 6/1979 | Miyahara et al. |
| 4,269,887 A | 5/1981 | Sonobe et al. |
| 4,271,228 A | 6/1981 | Foster et al. |
| 4,277,269 A | 7/1981 | Sweeting |
| 4,279,864 A | 7/1981 | Nara et al. |
| 4,328,187 A | 5/1982 | Musall et al. |
| 4,335,077 A | 6/1982 | Santiago et al. |
| 4,353,872 A | 10/1982 | Midorikawa |
| 4,385,135 A | 5/1983 | Langer et al. |
| 4,447,345 A | 5/1984 | Kummermehr et al. |
| 4,617,176 A | 10/1986 | Merry |
| 4,693,338 A | 9/1987 | Clerc |
| 4,752,515 A | 6/1988 | Hosoi et al. |
| 4,823,845 A | 4/1989 | Martin et al. |
| 4,849,382 A | 7/1989 | Shibata et al. |
| 4,855,576 A * | 8/1989 | Sterwald ............... 219/544 |
| 4,863,700 A | 9/1989 | Ten Eyck |
| 4,927,608 A | 5/1990 | Wörner et al. |
| 4,929,429 A | 5/1990 | Merry |
| 4,985,212 A | 1/1991 | Kawakami et al. |
| 5,002,836 A | 3/1991 | Dinwoodie et al. |
| 5,073,432 A | 12/1991 | Horikawa et al. |
| 5,094,074 A | 3/1992 | Nishizawa et al. |
| 5,139,615 A | 8/1992 | Conner et al. |
| 5,151,253 A | 9/1992 | Merry et al. |
| 5,167,765 A | 12/1992 | Nielsen et al. |

(Continued)

FOREIGN PATENT DOCUMENTS

| | | |
|---|---|---|
| DE | 3925845 | 2/1991 |
| EP | 0 205 704 A1 | 12/1986 |
| EP | 0 279 511 A2 | 8/1988 |
| EP | 0 319 299 A2 | 6/1989 |

(Continued)

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

Maret, Gulati, Lambert & Zink. Systems Durability of a Ceramic Racetrack Converter. International Fuels and Lubricants Meeting, Toronto, Canada, Oct. 7-10, 1991.

*Primary Examiner* — Jill A Warden

(74) *Attorney, Agent, or Firm* — Curatolo Sidoti Co., LPA; Joseph G. Curatolo; Salvatore A. Sidoti

(57) ABSTRACT

A mounting mat for an exhaust gas treatment device, includes at least one layer comprising inorganic fibers and a heater in thermal communication with the layer. Also disclose is an exhaust gas treatment device comprising an outer housing, a fragile structure located in the housing and the mounting mat located between the housing and the fragile structure. A method is further disclosed for maintaining and/or increasing the temperature of a substrate of an exhaust gas treatment device comprising providing the mounting mat and transferring heat from the heater to the mounting mat in order to maintain and/or increase the temperature of the substrate and/or the exhaust gas treatment device during the battery mode of a hybrid gas/electric vehicle.

3 Claims, No Drawings

(56) References Cited

U.S. PATENT DOCUMENTS

| | | |
|---|---|---|
| 5,250,269 A | 10/1993 | Langer |
| 5,290,522 A | 3/1994 | Rogers et al. |
| 5,332,699 A | 7/1994 | Olds et al. |
| 5,346,868 A | 9/1994 | Eschner |
| 5,380,580 A | 1/1995 | Rogers et al. |
| 5,384,188 A | 1/1995 | Lebold et al. |
| 5,393,499 A * | 2/1995 | Bagley et al. .......... 422/174 |
| 5,413,766 A * | 5/1995 | Dattge et al. .......... 422/174 |
| 5,419,975 A | 5/1995 | Lintz et al. |
| 5,453,116 A | 9/1995 | Fischer et al. |
| 5,488,826 A | 2/1996 | Paas |
| 5,567,536 A | 10/1996 | Lintz et al. |
| 5,585,312 A | 12/1996 | TenEyck et al. |
| 5,714,421 A | 2/1998 | Olds et al. |
| 5,811,360 A | 9/1998 | Jubb |
| 5,821,183 A | 10/1998 | Jubb |
| 5,862,590 A | 1/1999 | Sakashita et al. |
| 5,874,375 A | 2/1999 | Zoitos et al. |
| 5,883,363 A * | 3/1999 | Motoyoshi et al. .......... 219/535 |
| 5,928,975 A | 7/1999 | Jubb |
| 5,955,389 A | 9/1999 | Jubb |
| 6,000,131 A | 12/1999 | Schmitt |
| 6,025,288 A | 2/2000 | Zoitos et al. |
| 6,030,910 A | 2/2000 | Zoitos et al. |
| 6,051,193 A | 4/2000 | Langer et al. |
| 6,101,714 A | 8/2000 | Schmitt |
| 6,162,404 A | 12/2000 | Tojo et al. |
| 6,251,224 B1 | 6/2001 | Dong |
| 6,267,843 B1 | 7/2001 | Helwig et al. |
| 6,317,976 B1 | 11/2001 | Aranda et al. |
| 6,468,932 B1 | 10/2002 | Robin et al. |
| 6,589,488 B1 | 7/2003 | Eyhorn |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,861,381 B1 | 3/2005 | Jubb et al. |
| 6,923,942 B1 | 8/2005 | Shirk et al. |
| 6,953,757 B2 | 10/2005 | Zoitos et al. |
| 7,153,796 B2 | 12/2006 | Jubb et al. |
| 7,259,118 B2 | 8/2007 | Jubb et al. |
| 7,261,864 B2 | 8/2007 | Watanabe |
| 7,387,822 B2 | 6/2008 | Dinwoodie |
| 7,550,118 B2 | 6/2009 | Merry |
| 7,820,117 B2 | 10/2010 | Peisert et al. |
| 2001/0036427 A1 | 11/2001 | Yamada et al. |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2005/0272602 A1 | 12/2005 | Ninomiya |
| 2006/0154040 A1 | 7/2006 | Merry |
| 2006/0278323 A1 | 12/2006 | Eguchi |
| 2007/0065349 A1 | 3/2007 | Merry |
| 2007/0207069 A1 | 9/2007 | Kariya et al. |
| 2008/0253939 A1 | 10/2008 | Hornback |
| 2009/0114907 A1 | 5/2009 | Saiki |
| 2009/0246095 A1 | 10/2009 | Saiki |
| 2010/0207298 A1 | 8/2010 | Kunze et al. |
| 2010/0209306 A1 | 8/2010 | Kunze et al. |

FOREIGN PATENT DOCUMENTS

| | | |
|---|---|---|
| EP | 0 398 130 A2 | 11/1990 |
| EP | 0 465 203 A1 | 1/1992 |
| EP | 0 765 993 A1 | 4/1997 |
| EP | 0 803 643 A1 | 10/1997 |
| EP | 1 267 048 A1 | 12/2002 |
| EP | 1 495 807 A1 | 1/2005 |
| EP | 1 533 409 A1 | 5/2005 |
| EP | 1 696 110 A1 | 8/2006 |
| EP | 1 830 043 A1 | 9/2007 |
| EP | 1 905 895 A1 | 4/2008 |
| EP | 1 931 862 B1 | 6/2008 |
| EP | 1 950 035 A1 | 7/2008 |
| GB | 1 438 762 A | 6/1976 |
| GB | 1 438 784 A | 6/1976 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 6-272549 | 9/1994 |
| JP | 7-286514 | 10/1995 |
| JP | 2006-177368 A | 7/2006 |
| JP | 2009-236047 A | 10/2009 |
| WO | WO 97-32118 A1 | 9/1997 |
| WO | WO 99-23370 A1 | 5/1999 |
| WO | WO 00-75496 A1 | 12/2000 |
| WO | WO 01-65008 A1 | 9/2001 |
| WO | WO 01-83956 A1 | 11/2001 |
| WO | WO 02-33233 A1 | 4/2002 |
| WO | WO 02-053511 A1 | 7/2002 |
| WO | WO 03-000414 A1 | 1/2003 |
| WO | WO 03-031368 A2 | 4/2003 |
| WO | WO 2008-103525 A2 | 8/2008 |
| WO | WO 2008-154078 A1 | 12/2008 |
| WO | WO 2008-156942 A1 | 12/2008 |

* cited by examiner

HEATED MAT AND EXHAUST GAS TREATMENT DEVICE

This application claims the benefit of the filing date under 35 U.S.C. § 119(e) from U.S. Provisional Application for Patent Ser. No. 61/412,437 filed on Nov. 11, 2010.

Disclosed is a mat for use in an exhaust gas treatment device, such as catalytic converters and diesel particulate traps that are used in automotive exhaust systems. The mat may be used as a mounting mat to mount a fragile monolith within an outer housing of an exhaust gas treatment device.

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

A fragile catalyst support structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

Exhaust gas treatment devices may only efficiently remove and/or reduce pollutants in the exhaust gas when the exhaust gas treatment device is at an elevated temperature, such as a minimum of from about 200° C. to about 300° C. In conventional internal combustion engine vehicles, this is not usually an issue, because the exhaust gas treatment device heats up relatively quickly, due to hot exhaust gases passing through the device, during continuous operation of the internal combustion engine within the vehicle. Therefore, the exhaust gas treatment device operates efficiently for the vast majority of the time that the internal combustion engine is operating, to remove and/or reduce pollutants in the exhaust gas of the internal combustion engine.

Exhaust gas treatment devices, under certain circumstances, must be heated to a minimum temperature before they are able to effectively reduce and/or remove pollutants from the exhaust stream of the internal combustion engine. The point in time at which the catalytic converter reaches a fifty percent (50%) efficiency is commonly referred to as its "light-off" period. During normal, continuous operation of internal combustion engine vehicles, a hot exhaust gas stream is able to heat the exhaust gas treatment device to the minimum temperature relatively quickly, because the internal combustion engine provides a steady stream of hot exhaust gases to the exhaust gas treatment device. Thus, the time a typical internal combustion engine vehicle operates in a light-off period is negligible.

Hybrid gas/electric vehicles may include an internal combustion engine and at least one energy storage apparatus. During normal operation, hybrid gas/electric vehicles will alternate between powering the vehicle utilizing the internal combustion engine (ICE mode) and powering the vehicle using the at least one energy storage apparatus (battery mode). Because the internal combustion engine is only operated intermittently, the time the hybrid vehicle is operating in a light-off period is substantially greater than conventional internal combustion engine vehicles. Therefore, during a substantial amount of the time the internal combustion engine is operating, the exhaust gas treatment device may be incapable of adequately reducing and/or removing the pollutants in the exhaust gas stream.

Furthermore, in conventional internal combustion engine vehicles, more than fifty percent (50%) of hydrocarbon and carbon monoxide emissions are generated in the first sixty seconds of a standard emissions test cycle (e.g., the EPA75 test cycle), and more than twenty five percent (25%) of the $NO_x$ emissions are generated during that time. Due to the relatively poor efficiency of the catalytic converter prior to "light-off", recent efforts to reduce tailpipe emissions have concentrated on reducing the "light-off" time, thereby reducing the time during which the catalytic converter is least efficient. These prior efforts have also included concomitantly altering the air-fuel ratio and/or retarding the spark calibration of the engine.

These prior efforts have suffered from some drawbacks. Particularly, the difficulty in controlling the combustion stability of the engine and the operating load of the engine as it warms up severely limits these prior strategies. Moreover, although significant fractions of the emissions are produced during "cold start" type conditions (e.g., during the first sixty seconds of vehicle operation), periods when engine operating loads are changing rapidly or "transient events" also produce a significant portion of the emissions, specifically $NO_x$ emissions. Hence, these methods which concentrate on cold-start type operating conditions do not adequately address or improve emissions during transient events once the vehicle has warmed up.

What is needed in the industry is a mat for exhaust gas treatment devices which is (i) capable of heating the exhaust gas treatment device during battery mode of a hybrid vehicle in order to ensure that the exhaust gas treatment device operates optimally to reduce and/or remove pollutants in the exhaust gas stream when the hybrid vehicle is in ICE mode, and (ii) capable of heating the exhaust gas treatment device during the "light off" period of conventional internal combustion engine vehicles.

A mounting mat for an exhaust gas treatment device is provided, comprising a heater in thermal communication with at least one layer of the mounting mat, disposed adjacent to or within the mat. An exhaust gas treatment device and a method of maintaining and/or increasing the temperature of a substrate of an exhaust gas treatment device are also provided.

According to certain embodiments, the mounting mat comprises at least one layer comprising inorganic fibers, and a heater in thermal communication with the layer. The mat may comprise at least two layers comprising inorganic fibers, and the heater may be disposed between the at least two layers. The mat may comprise a single layer comprising inorganic fibers, and the heater may be disposed within the mat. The mat may comprise a single layer comprising inorganic fibers, and the heater may be disposed adjacent to the mat.

The heater may comprise at least one electric resistance heater. Electrical resistance heaters work by converting electrical energy into heat energy by passing the electricity into and/or through an electrical resistor. The electrical resistance heater may comprise an electrically resistive wire embedded within or adjacent to the mat. Any other heater may be utilized, however, as long as it will be able to function as described herein. The heater may be capable of heating the mat to a minimum of about 200° C. to about 300° C.

Also provided is an exhaust gas treatment device comprising a housing, a fragile structure resiliently mounted within the housing, and a mounting mat as described above comprising at least one layer comprising inorganic fibers, and a heater disposed adjacent to or within the mat.

Further provided is a method of maintaining and/or increasing the temperature of a substrate of an exhaust gas treatment device comprising providing a mounting mat as described above, and transferring heat from the heater to the mounting mat in order to maintain and/or increase the temperature of the substrate and/or the exhaust gas treatment device.

A substrate is a component in an exhaust gas treatment device which modifies exhaust material. There are many kinds of exhaust gas treatment devices which may comprise a substrate. One type of exhaust gas treatment device is a catalytic converter. The active portion of a catalytic converter comprises a substrate coated or impregnated with a catalyst to promote oxidation of carbon monoxide and hydrocarbons and the reduction of oxides of nitrogen, eliminating undesired products of combustion in the exhaust stream.

Substrate monoliths are typically oval or round in cross-sectional configuration, but other shapes are possible. The substrate is spaced from its housing by a gap width distance which will vary according to the type and design of the device utilized, e.g., a catalytic converter, a diesel catalyst structure, or a diesel particulate trap. According to some embodiments, the gap may be at least about 0.05 inch (1.27 mm), and in other embodiments the gap may be up to about one inch (25.4 mm) or more. This gap width may typically range from about 3 mm to about 25 mm with a range of about 3 mm to about 8 mm being commercially common widths. The substrate mounting mat is disposed in this space to provide both thermal insulation to the external environment and mechanical support to the ceramic monolith substrate, protecting the substrate from damage due to mechanical shock.

A diesel particulate filter is another type of exhaust gas treatment device. The active portion of a diesel particulate filter comprises a substrate acting as a filter. A diesel particulate trap may include one or more porous tubular or honeycomb-like structures (having channels closed at one end, however), which are mounted by a thermally resistant material within a housing. Particulate is collected from exhaust gases in the porous structure, typically until regenerated by a high temperature burnout process.

Another type of exhaust gas treatment device is a selective catalyst reduction unit. The active portion of a selective catalyst reduction unit comprises a substrate coated with a catalyst to promote chemical reduction and elimination of undesired products in the exhaust stream.

Another type of exhaust gas treatment device is a $NO_x$ trap. The active portion of a $NO_x$ trap comprises a catalytic substrate comprising alkali or alkaline earth materials. The trap operates in a cyclic manner; cycling between a "sorbtion" process and a "regeneration" process. During sorbtion the substrate intakes $NO_x$ species and traps them on the surface of the catalytic substrate as nitrate species. During regeneration, a reducing material is introduced into the $NO_x$ trap and the nitrate species are removed from the substrate and reduced to nitrogen.

Non-automotive applications for the subject mounting system include but are not limited to catalytic converters for chemical industry emission (exhaust) stacks.

In an exhaust gas treatment device, the substrate may operate at temperatures substantially above ambient temperature (about 20° C.). Without limitation, the operating temperature for certain embodiments of exhaust gas treatment devices is about 1000° C. Because of the substantially elevated temperatures at which it operates, the substrate typically comprises materials having excellent resistance to heat: a very high melting point, and very low thermal expansion coefficient. There are many materials which have these properties including a wide variety of ceramics, tungsten, rhenium, and more exotic materials. One group of very common materials which exhibit excellent resistance to heat is ceramics. Exhaust gas treatment device substrates typically comprise a frangible material, such as a monolithic structure formed of a brittle, fireproof ceramic material such as, but not limited to, aluminum oxide, silicon dioxide, magnesium oxide, zirconia, cordierite, silicon carbide and the like.

A housing is a hollow body which at least partially surrounds or shrouds the substrate. The housing protects the substrate from impact, torsion, tension, compression, or other mechanical loading which may damage the substrate. In certain embodiments the housing comprises a thin shell. The housing comprises materials having good resistance to heat: a high melting point and high heat resistance. The materials comprising exhaust gas treatment device housings are commonly ductile materials comprising a lower heat resistance than the monolith, a higher thermal expansion coefficient than the monolith, and a higher impact resistance than the monolith. Without limitation, in certain embodiments, the exhaust gas treatment device housing comprises a metal or metal alloy, such as high temperature-resistant steel.

The inorganic fibers which comprise the at least one layer of the mat may comprise any known inorganic fibers which are suitable for use in the mat, such as those which are suitable for use in mounting mats for exhaust gas treatment devices. Without limitation, examples of such inorganic fibers include inorganic biosoluble fibers, inorganic non-respirable fibers, refractory ceramic fibers, glass fibers, and the like.

The term "biosoluble" inorganic fibers refer to inorganic fibers that are soluble or otherwise decomposable in a physiological medium or in a simulated physiological medium, such as simulated lung fluid. The solubility of the fibers may be evaluated by measuring the solubility of the fibers in a simulated physiological medium over time. A method for measuring the biosolubility (i.e. the non-durability) of the fibers in physiological media is disclosed U.S. Pat. No. 5,874,375 assigned to Unifrax, which is incorporated herein by reference. Other methods are suitable for evaluating the biosolubility of inorganic fibers. According to certain embodiments, the biosoluble fibers exhibit a solubility of at least 30 $ng/cm^2$-hr when exposed as a 0.1 g sample to a 0.3 ml/min flow of simulated lung fluid at 37° C. According to other embodiments, the biosoluble inorganic fibers may exhibit a solubility of at least 50 ng/cm²-hr, or at least 100 ng/cm²-hr, or at least 1000 ng/cm²-hr when exposed as a 0.1 g sample to a 0.3 ml/min flow of simulated lung fluid at 37° C.

Without limitation, suitable examples of biosoluble inorganic fibers that can be used to prepare the subject mat, as well as mounting mats for exhaust gas treatment devices include those biosoluble inorganic fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,975, 5,821,183, and 5,811,360, each of which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and about 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and about 5 weight percent or less impurities. According to other embodiments, the alkaline earth silicate fibers comprise the fiberization product of about 70 to about 86 weight percent silica, about 14 to about 30 weight percent magnesia, and about 5 weight percent or less impurities. More information on magnesia-silicate fibers can be found in U.S. Pat. No. 5,874,375, which is hereby incorporated by reference.

A suitable magnesium-silicate fiber is commercially available from Unifrax I LLC (Niagara Falls, N.Y.) under the registered trademark ISOFRAX®. Commercially available ISOFRAX® fibers generally comprise the fiberization product of about 70 to about 80 weight percent silica, about 18 to about 27 weight percent magnesia and about 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silicate fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and about 10 weight percent or less impurities. Typically, biosoluble calcia-magnesia-silica fibers comprise about 15 to about 35 weight percent calcia, about 2.5 to about 20 weight percent magnesia, and about 60 to about 70 weight percent silica.

Useful calcia-magnesia-silicate fibers are commercially available from Unifrax I LLC (Niagara Falls, N.Y.) under the registered trademark INSULFRAX®. INSULFRAX® fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL® 607 and SUPERWOOL® 607 MAX. SUPERWOOL® 607 fibers comprise about 60 to about 70 weight percent silica, from about 25 to about 35 weight percent calcia, from about 4 to about 7 weight percent magnesia, and trace amounts of alumina. SUPERWOOL® 607 MAX fibers comprise about 60 to about 70 weight percent silica, from about 16 to about 22 weight percent calcia, from about 12 to about 19 weight percent magnesia, and trace amounts of alumina.

The mat may comprise sol-gel derived fibers. Sol-gel derived fibers are made by dissolving oxide precursors in liquid and spinning to form a fiber. The spun fiber is dried and calcined to form the final oxide fiber. The spinning step may be accomplished via centrifugal spinning, drawing, blowing, tack-spinning, extrusion of the liquid through a spinneret or suitable combinations thereof. U.S. Pat. Nos. 4,159,205 and 4,277,269 discuss various methods of making sol-gel derived fibers. Suitable sol-gel derived fibers include, without limitation, alumina fibers, high alumina fibers and mullite fibers. In certain embodiments, alumina fibers may comprise at least about 60% by weight alumina. In certain embodiments, high alumina fibers may comprise at least about 95% by weight alumina, the remainder typically being silica, but perhaps additional oxides. In certain embodiments, mullite fibers may comprise about 72% by weight alumina and about 28% by weight silica, optionally with additional oxides present in small amounts.

The mat may comprise leached glass fibers. According to certain embodiments, leached glass fibers may have a silica content of at least about 67 percent by weight. In certain embodiments, the leached glass fibers contains at least about 90 percent by weight, and in certain of these, from about 90 percent by weight to less than about 99 percent by weight silica. The mean fiber diameter of these leached glass fibers may be about 6 microns. On average, the glass fibers typically have a mean diameter of about 9 microns, up to about 14 microns. These leached glass fibers are non-respirable.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX® and from Hitco Carbon Composites, Inc. of Gardena Calif., under the registered trademark REFRASIL®, and from Polotsk-Steklovolokno, Republic of Belarus, under the designation PS-23®.

The BELCOTEX® fibers are standard type, staple fiber pre-yarns. These fibers have an average fineness of about 550 tex and are generally made from silicic acid modified by alumina. The BELCOTEX® fibers are amorphous and generally contain about 94.5 silica, about 4.5 percent alumina, less than about 0.5 percent sodium oxide, and less than about 0.5 percent of other components. These fibers have an average fiber diameter of about 9 microns and a melting point in the range of about 1500° C. to about 1550° C. These fibers are heat resistant to temperatures of up to 1100° C., and are typically shot free and binder free.

The REFRASIL® fibers, like the BELCOTEX® fibers, are amorphous leached glass fibers high in silica content for providing thermal insulation for applications in the 1000° C. to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of about 1 percent or less.

The PS-23® fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL® fibers, have a melting point of about 1700° C.

In certain embodiments, a flexible, fibrous mat may comprise a substantially non-expanding composite sheet of high temperature resistant fibers and a binder. In certain embodiments, the mounting mat is "integral", meaning that after manufacture the mounting mat has self supporting structure, needing no reinforcing or containment layers of fabric, plastic or paper, (including those which are stitch-bonded to the mat) and can be handled or manipulated without disintegration. By "substantially non-expanding" is meant that the sheet does not readily expand upon the application of heat as would be expected with an intumescent layer. Of course, some expansion of the sheet does occur based upon its thermal coefficient of expansion. The amount of expansion, however, is insubstantial as compared to the expansion which occurs based upon intumescent properties. It will be appreciated that these substantially non-expanding mounting mats are substantially devoid of intumescent materials.

The mat may include a binder. Suitable binders may include aqueous and non aqueous binders, but the binder utilized may be a reactive, thermally setting latex which after cure is a flexible material that is stable up to at least about 350° C.

Either a single type of binder or mixture of more than one type of binder may be included within the mounting mat. Suitable binders include organic binders, inorganic binders and mixtures of these two types of binders. According to certain embodiments, the mat includes one or more organic binders. The organic binders may be provided as a solid, a liquid, a solution, a dispersion, a latex, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 0.5 to about 15 weight percent, from about 1 to about 10 weight percent, or from about 2 to about 8 weight percent, based on the total weight of the mounting mat.

The mounting mat may include polymeric binder fibers instead of, or in combination with, the resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat treated fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

When an organic binder is used, the components are mixed to form a mixture or slurry. The slurry of fibers and binder is then formed into a mat structure. Typically, a sacrificial binder is employed to initially bond the fibers together. By "sacrificial", it is meant that the organic binder will eventually be burned out of the mounting mat, leaving only the heat treated fibers (and other ceramic or glass fibers, if used) as the mounting mat for supporting the fragile structure.

In addition to organic binders, the mounting mats may also include inorganic binder material. Without limitation, suitable inorganic binder materials include inorganic particulate materials, colloidal dispersions of alumina, silica, zirconia, and mixtures thereof.

The mounting mat may be prepared by any known techniques commonly used in the preparation of mounting mats. For example, using a papermaking process, the fibers may be mixed with a binder or other binder fibers to form a mixture or slurry. The fibrous components may be mixed at about 0.25% to about 5% consistency or solids content (about 0.25 to about 5 parts solids to about 99.75 to about 95 parts water). The slurry may then be diluted with water to enhance formation, and it may finally be flocculated with a flocculating agent and drainage retention aid chemicals. The flocculated mixture or slurry may be placed onto a papermaking machine to be formed into a ply or sheet of fiber containing paper. Alternatively, the plies or sheets may be formed by vacuum casting the slurry. In either case, the plies or sheets may be dried in ovens. For a more detailed description of standard papermaking techniques employed, see U.S. Pat. No. 3,458,329, the disclosure of which is incorporated herein by reference.

In other embodiments, the fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a fiber composite. In this technique, the binder is added after formation of the mat, rather than forming the mat as noted herein with respect to the conventional papermaking technique.

Methods of impregnation of the mat with the binder include complete submersion of the mat in a liquid binder system, or alternatively brushing, coating, dipping, rolling, splashing, or spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat is then passed between press rolls, which remove excess liquid and densify the mat to approximately its desired thickness. The densified mat may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the mat and pressing to remove excess liquid, thereafter drying to form the composite and storing or cutting to size.

The mats may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the desired form.

Regardless of which of the above-described techniques are employed, the mounting mat may be cut, such as by die stamping, to form mounting mats of exact shapes and sizes with reproducible tolerances. The mounting mat exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure or like fragile structure without cracking, and then disposed within the catalytic converter housing. Generally, the mounting mat-wrapped fragile structure can be inserted into a housing or the housing can be built or otherwise fabricated around the mounting mat-wrapped fragile structure.

In certain embodiments, the heater may be incorporated into the mat, or one of the layers of a multiple layer mat, during manufacture of the mat. The heater may be located between two layers of inorganic fibers to produce a multiple layer mat. The heater may also be placed on an exterior surface of the mat, or on the exterior surface of one of the layers of a multiple layer mat. In certain embodiments, the heater may be an electrical resistive heater wire.

For example, a layer of fibers may be formed into a first layer using any of the above-described methods, the heater may be placed in contact with the first layer, and a second layer may be placed (or formed) on top of the heater. In such a manner, the heater and first and second layer may be permanently engaged with one another. The layers may be permanently engaged by an adhesive material, or by mechanical means, such as threading, stitching, sewing, needling, hydroentangling, or stapling. Alternatively, the heater may be formed within the thickness of the mat while the mat is formed, or the heater may be engaged with a major surface of a single-layer mat.

As an exhaust gas treatment device cycles from ambient temperature to operating temperature, the components comprising the device reach their individual operating temperatures. The operating temperature for any given component in the exhaust gas treatment device may be less than the operating temperature for the device itself, because some components are insulated from higher temperature components. As components heat, they will expand in proportion to their thermal expansion coefficients.

The mat with heater may be used in hybrid gas/electric vehicles to limit the amount of time that the vehicle operates in a "light-off" period. The light-off period is the time it takes the exhaust gas treatment device to come to its minimum operating temperature (from about 200° C. to about 300° C.). During this period, the exhaust gas treatment device, being below its minimum operating temperature, does not adequately remove pollutants and/or particulate matter from the exhaust gas stream. The mat and associated heater actively work to maintain and/or increase the temperature of the substrate while the internal combustion engine of the hybrid gas/electric vehicle is not operating, so that when the internal combustion engine is activated, the exhaust gas treatment device is already heated to the point where it may operate effectively. Accordingly, the heater is used to transfer thermal energy sufficient to raise the temperature of the fragile structure to a temperature such that catalyst may affect the oxidation of carbon monoxide and hydrocarbons and the reduction of oxides of nitrogen.

The following examples are set forth merely to further illustrate the mounting mat and exhaust gas treatment device. The illustrative examples should not be construed as limiting the mounting mat, exhaust gas treatment device incorporating the mounting mat, or the methods of making the mounting mat or the exhaust gas treatment device in any manner.

Two layers for a mounting mat were prepared, one with a basis weight of 1200 gsm, and one with a basis weight of 200 gsm, according to the methods described herein. A continuous heating wire (20 AWG Kanthal™ from Pelican Wire Company, Naples, Fla.) was coiled manually to cross the mat 48 times at approximate lengths of 57 mm with approximately 7.6 mm between wire lengths. The continuous wire was placed between the two layers, and the layers were pressed together to form the mounting mat.

The mounting mat was wrapped around an exhaust gas treatment device substrate. The wrapped substrate was mounted inside a metal housing with a 4 mm gap between the housing and the substrate. The device was instrumented with five thermocouples. One thermocouple measured the temperature of the housing and the other four thermocouples were situated at equidistance between the center and the periphery of the substrate in order to measure the temperature of the substrate at various locations.

The initial temperature of the housing and substrate were taken, and the heater apparatus was set to increase the temperature of the housing to 100° C. The temperature of the shell was held at 100° C. for 1.5 hours. The heater apparatus was then set to increase the temperature of the housing to 300° C. in 10 minutes, after which the temperature of the housing was held at 300° C. for 1.5 hours. This procedure was followed to increase the temperature of the housing to 600° C., and hold it for 1.5 hours, and then to increase the temperature again to 900° C., and hold it for 1.5 hours. The readings from the various thermocouples positioned within the substrate are shown in Table 1. The thermocouples, T-A, T-B, T-C and T-D were positioned in the substrate such that thermocouple T-A was positioned near the center of the substrate, and thermocouple T-D was positioned near the housing, with thermocouples T-B and T-C spaced evenly between T-A and T-D, such that T-B was near T-A and T-C was near T-D. The thermocouples were substantially evenly spaced from each other within the substrate, with T-D being as distant from the housing as it was distant from T-C.

TABLE 1

| Housing Temp. (° C.) | Time (min) | T-A (° C.) | T-B (° C.) | T-C (° C.) | T-D (° C.) |
|---|---|---|---|---|---|
| Initial | — | 23 | 22 | 21 | 22 |
| 100 | 0 | 33 | 36 | 45 | 72 |
| 100 | 10 | 59 | 63 | 71 | 89 |
| 100 | 20 | 67 | 70 | 76 | 90 |
| 100 | 30 | 69 | 72 | 77 | 90 |
| 100 | 40 | 69 | 72 | 77 | 90 |
| 100 | 70 | 69 | 72 | 77 | 90 |
| 300 | 100 | 89 | 101 | 133 | 222 |
| 300 | 110 | 150 | 168 | 199 | 267 |
| 300 | 120 | 172 | 188 | 213 | 271 |
| 300 | 130 | 177 | 192 | 216 | 271 |
| 300 | 140 | 178 | 193 | 217 | 271 |
| 300 | 170 | 179 | 194 | 217 | 272 |
| 600 | 200 | 202 | 233 | 302 | 482 |
| 600 | 210 | 286 | 322 | 389 | 529 |
| 600 | 220 | 322 | 356 | 413 | 540 |
| 600 | 230 | 331 | 363 | 419 | 542 |
| 600 | 240 | 332 | 365 | 420 | 543 |
| 600 | 270 | 333 | 366 | 420 | 542 |

TABLE 1-continued

| Housing Temp. (° C.) | Time (min) | T-A (° C.) | T-B (° C.) | T-C (° C.) | T-D (° C.) |
|---|---|---|---|---|---|
| 900 | 300 | 342 | 389 | 493 | 746 |
| 900 | 310 | 450 | 505 | 606 | 805 |
| 900 | 320 | 484 | 533 | 622 | 809 |
| 900 | 330 | 490 | 538 | 626 | 810 |
| 900 | 340 | 491 | 539 | 626 | 810 |
| 900 | 370 | 492 | 540 | 627 | 811 |

While the mat and exhaust gas treatment device have been described in connection with various embodiments, it is to be understood that other similar embodiments may be used or modifications and additions may be made to the described embodiments for performing the same function. Furthermore, the various illustrative embodiments may be combined to produce the desired results. Therefore, the mat and exhaust gas treatment device should not be limited to any single embodiment, but rather construed in breadth and scope in accordance with the recitation of the appended claims.

The invention claimed is:

1. An exhaust gas treatment device comprising:
a housing;
a fragile structure resiliently mounted within the housing; and
a mounting mat disposed between said housing and said fragile structure comprising at least two layers comprising inorganic fibers and a heater comprising an electrical resistive heater wire disposed between said at least two layers.

2. The exhaust gas treatment device of claim 1, wherein the heater is capable of heating the fragile structure to a temperature of about 200° C. to about 300° C.

3. A method of maintaining and/or increasing the temperature of a substrate of an exhaust gas treatment device comprising:
providing a mounting mat comprising (i) at least two layers comprising inorganic fibers and a heater comprising an electrical resistive heater wire disposed between said at least two layers; and
transferring heat from the heater to the mounting mat in order to maintain and/or increase the temperature of the substrate and/or the exhaust gas treatment device.

* * * * *